(No Model.)
J. S. PALMER & C. R. WATROUS.
LOBSTER TRAP.
No. 483,471. Patented Sept. 27, 1892.
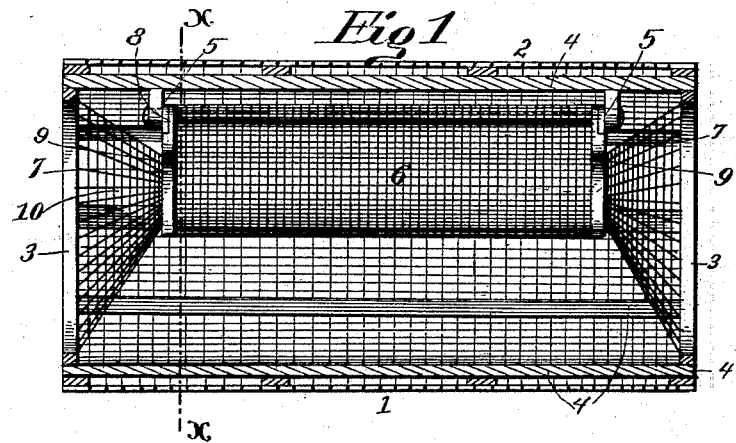
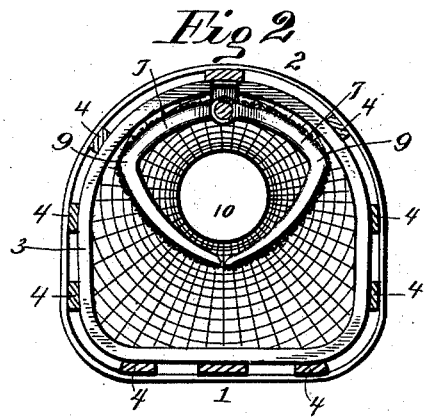
Witnesses
C. C. Burdine
H. Hume Clendenin
Inventors:
Charles R. Watrous,
John S. Palmer.
Attorneys.

UNITED STATES PATENT OFFICE.

JOHN STANTON PALMER, OF STONINGTON, AND CHARLES ROBERT WATROUS, OF LEDYARD, CONNECTICUT.

LOBSTER-TRAP.

SPECIFICATION forming part of Letters Patent No. 483,471, dated September 27, 1892.

Application filed April 1, 1892. Serial No. 427,394. (No model.)

*To all whom it may concern:*

Be it known that we, JOHN STANTON PALMER, residing at Stonington, and CHARLES ROBERT WATROUS, residing at Ledyard, in the county of New London and State of Connecticut, citizens of the United States, have invented certain new and useful Improvements in Lobster-Traps; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in fish-traps, and more particularly to those used in lobster-fishing. Our object is to produce a trap that while simple will at the same time facilitate the entrance of the lobster and more effectively prevent its escape.

With these objects in view our invention consists in the peculiar features and combinations of parts more fully described hereinafter, and pointed out in the claims.

In the accompanying drawings, Figure 1 represents a longitudinal section of our invention; Fig. 2, a cross-section on line X X of the preceding figure.

Our trap in the present instance is oblong in shape, having a flat bottom 1 and a round or oval top 2. The ends are permanently held open by braces 3, which are kept apart at each end of the trap by brace strips or rods 4, which add strength and stability to the whole structure. Suspended from the upper brace-rod 4 by means of hinges 5 is a smaller internal trap 6, which has bowed arms 7, suspended from the hinges 5 at the top. These arms are bent in the shape of an elbow at 9 and extend downwardly, their lower ends meeting. By using this shape of end piece it will be seen that when a lobster enters the interior and brings his weight on the free ends of the arms they will separate and drop him into the larger receptacle below, when the arm or elbow pieces 7 will again come together.

The internal trap is shorter than the outer one, and its opposite ends are placed a short distance from each end of the outer trap, and the only entrance to the internal trap is through the tapering nets 10, having their smaller ends projecting into the ends of the internal trap and their large ends attached to the braces 3. This inclined net is in the form of a truncated cone. The braces 3 are of one piece of wood and bent in the desired form, their ends being spliced.

It will be understood that the outside structure is surrounded by netting for holding the lobsters.

The trap is first baited and then sunk in the desired position. The bait is placed in the internal trap and suspended from the top or other suitable place. The lobster, seeing the bait, naturally tries to reach it, and the only way in is by the entrance, so he climbs the inclined sides of the guide-nets and enters the opening 11 in the internal trap. As soon as he enters the latter his weight will spread the arms 7, which swing on the hinge 5, and drop him into the lower trap or receptacle below. It is impossible for the lobster to get out of this trap, and for this reason the trap can be sunk for a considerable length of time without fear of the lobsters escaping.

Having thus described our invention, what we claim as new, and desire to secure by Letters Patent, is—

1. In a trap for lobsters, &c., an outer compartment containing an internal trap consisting of an oblong net or cage provided with a pair of hinged arms suspended from the top of the outer compartment and a cone-shaped entrance projecting between said arms, as and for the purpose specified.

2. The combination of a trap for lobsters,

&c., of an outer compartment containing an oblong internal trap consisting of a suspended net or cage having spreadable arms at each end, whereby the bottom opens, and a conical entrance projecting into said internal trap, as and for the purpose set forth.

3. In a trap for lobsters, &c., an outer compartment, in combination with an internal trap consisting of a pair of spreadable arms and network secured thereto, said arms being adapted to part and drop the contents of the internal trap on receiving its victim, as set forth.

In testimony whereof we affix our signatures in presence of two subscribing witnesses.

JOHN STANTON PALMER.
CHARLES ROBERT WATROUS.

Witnesses as to signature of John Stanton Palmer:
HENRY H. FENN,
CHARLES B. BISHOP.

Witnesses as to signature of Charles Robert Watrous:
NA. PENDLETON,
MOSES A. PENDLETON.